United States Patent [19]

Miyashita

[11] Patent Number: 5,586,182
[45] Date of Patent: Dec. 17, 1996

[54] PORTABLE TELEPHONE SET

[75] Inventor: Toshikazu Miyashita, Tokyo, Japan

[73] Assignee: NEC Corporation, Tokyo, Japan

[21] Appl. No.: 431,969

[22] Filed: May 1, 1995

[30] Foreign Application Priority Data

May 11, 1994 [JP] Japan .................... 6-097193

[51] Int. Cl.$^6$ .................... H04B 1/38; H04M 1/19
[52] U.S. Cl. .................... 379/413; 379/433; 379/440; 379/396; 379/58
[58] Field of Search .................... 379/413, 433, 379/396, 440, 396, 58, 67, 128, 129, 63, 457, 56, 57

[56] References Cited

U.S. PATENT DOCUMENTS

| | | | |
|---|---|---|---|
| 4,135,067 | 1/1979 | Bitko | 200/61.52 |
| 5,111,503 | 5/1992 | Takagi | 379/433 |
| 5,117,073 | 5/1992 | Mischenko | 379/433 |
| 5,185,790 | 2/1993 | Mischneko | 379/433 |
| 5,193,108 | 5/1993 | Stocklin | 379/457 |
| 5,450,619 | 9/1995 | Maed | 379/433 |
| 5,493,690 | 2/1996 | Shimazaki | 379/63 |

FOREIGN PATENT DOCUMENTS

| | | |
|---|---|---|
| 0275193A3 | 7/1988 | European Pat. Off. . |
| 0329399A2 | 8/1989 | European Pat. Off. . |
| 63-248258 | 10/1988 | Japan . |
| 3036856 | 2/1991 | Japan . |
| 2222747 | 3/1990 | United Kingdom . |
| WO9107836 | 5/1991 | WIPO . |

OTHER PUBLICATIONS

European Search Report.

*Primary Examiner*—Thomas W. Brown
*Assistant Examiner*—Jacques M. Saint-Surin
*Attorney, Agent, or Firm*—Whitham, Curtis, Whitham, McGinn

[57] ABSTRACT

For a portable telephone set having a display portion for displaying various information associated with call or origination and reception, a gyro for detecting inclination of a main body is provided. When substantially horizontal position of the main body for dialing is detected by the gyro, power supply for the display portion is initiated. On the other hand, when the vertical position of the main body for speaking is detected by the gyro, supply for the display portion is shut off.

9 Claims, 3 Drawing Sheets

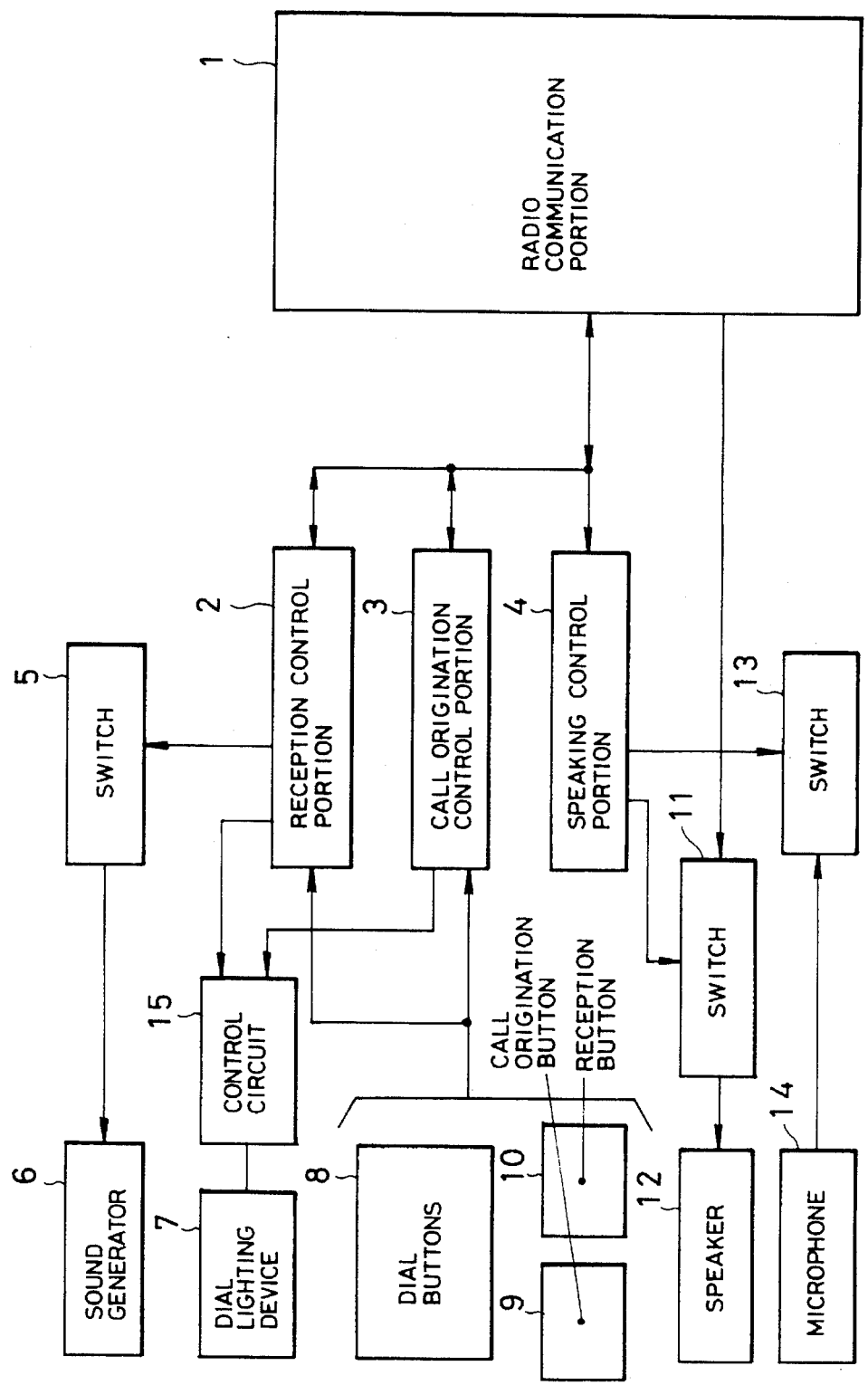

PORTABLE TELEPHONE SET

BACKGROUND OF THE INVENTION

1. Field of the Invention

The present invention relates to a pocket telephone or portable telephone set. More specifically, the invention relates to a portable telephone set which has a display for displaying various information associated with call origination and reception.

2. Description of the Related Art

The conventional portable telephone set has been designed to display a number as component of dialing operation on a display upon call origination. An example of such portable telephone set with a display function is illustrated in FIG. 4.

In such portable telephone, the number is input by operating dial buttons 8, and then a call origination button 9 is depressed. By these operations, a call is performed by a call control portion 3 and a radio communication portion 1. At this time, when a remote terminal answers, a speaking control portion 4 turns switches 11 and 13 to enable conversation with a destination via person a speaker 12 and a microphone 14.

On the other hand, when a call is received from the remote terminal, a reception control portion turns a switch 5. Then, a sound generator 6 becomes active to generate a ring sound. When a reception button 10 is depressed after the ring sound is generated, the speaking control portion 4 turns switches 11 and 13 so as to enable speaking with the caller.

In the above-mentioned portable telephone set, by controlling a dial lighting device 7 for lighting the dial buttons 8 by a control circuit 16, the dial lighting device 7 maintains illumination of the dial button in the internal from reception of the call at the remote terminal to a response to the call.

By this, even when the portable telephone set is placed in the dark, for example when a call is received in the bed, the portable telephone set can be easily located since the dial lighting device 7 lights the dial buttons 8. Such technology has been disclosed in Japanese Unexamined Patent Publication No. 63-248258.

In the above-mentioned portable telephone set, while the dial lighting device is designed to turn ON and OFF the lighting of the dial buttons depending upon call origination and reception, it does not control ON and OFF of the display on the display portion.

Accordingly, a power is constantly supplied to the display portion which is rarely checked for content during speaking. Therefore, while the content of the display on the display screen will not be seen during speaking, display is performed which consumes a corresponding amount of power to correspondingly exhaust a battery.

SUMMARY OF THE INVENTION

The present invention is directed to solving the problem set forth above. It is therefore an object of the present invention to provide a portable telephone set which can shut off the power supply for a display portion while a content of the display will not be seen during speaking, and thus can reduce power consumption.

According to one aspect of the invention, a portable telephone set comprises:

a display device for displaying information associated with a call;

a detector apparatus for detecting the orientation a main body, in which the display means is built-in; and a control apparatus for controlling power supply for the display depending upon the orientation detected by the detector.

In the preferred construction the detector is a gyro. The control apparatus may shut off the power supply for the display when the detector detects the main body at a substantially vertical position. On the other hand, the control may initiate power supply for the display when the detector detects the main body at a substantially horizontal position.

According to another aspect of the invention, a portable telephone set comprises:

call origination control device responsive to a dialing operation for controlling call origination;

reception control apparatus apparatus responsive to reception of call for controlling reception;

display device for displaying information associated with call origination and reception;

a main body housing the call origination control, the reception control and the display;

detector apparatus for detecting inclination of the main body; and control for controlling the power supply for the display, the control being responsive to the detector detecting a, substantially horizontal position of the main body for initiating power supply for the display.

The control may be responsive to the detector detecting a substantially vertical position for speaking after dialing operation, for shutting off the power supply for the display.

According to a further aspect of the invention, a portable telephone set comprises:

a call origination controller responsive to a dialing operation for controlling call origination;

a reception controller responsive to reception of call for controlling reception;

a display unit for displaying information associated with call origination and reception;

a main body housing the call origination control, the reception controller and the display unit, the main body having operation button array for dialing operation, call origination and reception;

an inclination detector incorporated in the main body for detecting the main body at a predetermined range of inclination magnitude in speaking condition; and a display controller for controlling the power supply for the display unit, the display controller being responsive to the inclination detector detecting the main body within the predetermined range of inclination magnitude for shutting down power supply.

The display controller may be responsive to the inclination detector detecting the inclination magnitude of the main body out of the predetermined range for initiating power supply when at least one of the buttons in the operation button array is operated.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 4 is a block diagram showing the construction of the conventional portable telephone set.

DESCRIPTION OF THE PREFERRED EMBODIMENT

The preferred embodiment of a portable telephone set according to the present invention will be discussed with reference to the accompanying drawings, particularly to FIGS. 1 to 3. In the following description, numerous specific details are set forth in order to provide a thorough understanding of the present invention. It will be obvious, however, to those skilled in the art that the present invention may be practiced without these specific details. In addition, well-known structures are not shown in detail in order to unnecessary obscure the present invention.

Figure 1:
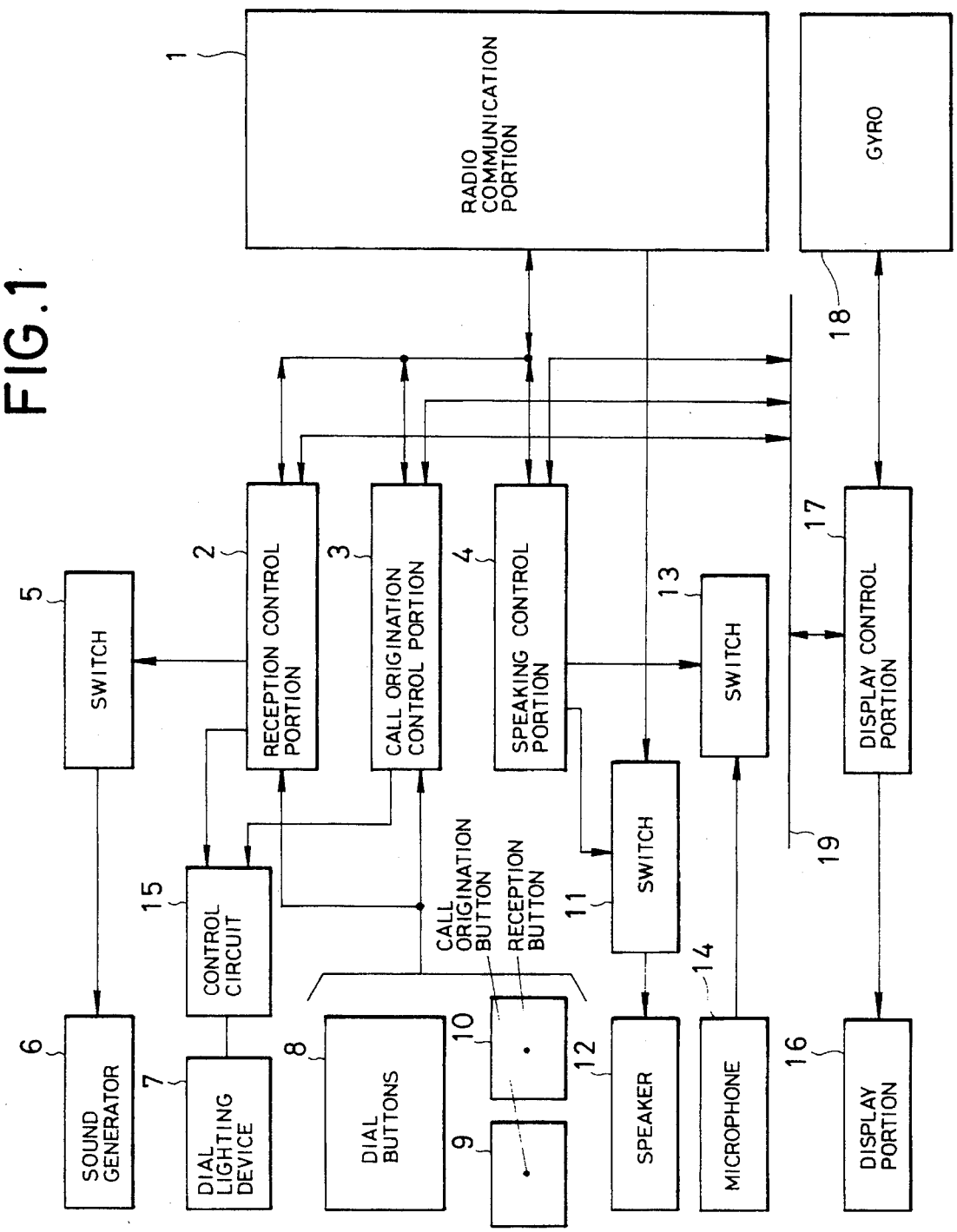
FIG. 1 is a block diagram of one embodiment of a portable telephone set according to the present invention.

FIG. 1 is a block diagram showing a construction of one embodiment of the portable telephone set according to the present invention. FIG. 1, encompasses one embodiment of the portable telephone set according to the invention with substantially the same construction as FIG. 4 except for a display portion 16, a display control portion 17 and a gyro 18 as additional components. In the following discussion, the like reference numerals to FIG. 4 show like elements. It should be noted that the preferred embodiment of the present invention discussed hereinafter should be applicable even for the portable telephone set which does not have the dial lighting device 7 and the control circuit 15.

The display control portion 17 is connected to a reception control portion 2, a call origination control portion 3 and a speaking control portion 4, respectively, via a common path 19. Control information associated with speaking is displayed on the display portion 16. On the other hand, the display control portion 17 also controls power supply for the display portion 16.

The gyro 18 detects an inclination of a main body the portable telephone set to provide information concerning an inclination angle to the display control portion 17. The display control portion 17 receives the inclination angle information from the gyro 18. The display control portion 17 is responsive to the inclination angle information indicative of a substantially horizontal orientation of the main body and to one of reception control command from the reception control portion 2 and a call origination control command from the call origination control portion 3, to control a power source to supply a power to the display portion 16.

In contrast, the display control portion 17 is responsive to the inclination angle information indicative of variation of the inclination angle from the substantially horizontal orientation to the substantially vertical orientation while it performs display control for the display portion 16 to display the control information, to terminate the power supply for the display portion 16.

When speaking is performed with the destination person via the speaker 12 and the microphone 14, it is rare to require seeing the display content on the display portion 16. Therefore, the power supply for the display portion 16 is shut down. Thus, exhausting of a battery can be reduced.

Figure 2:
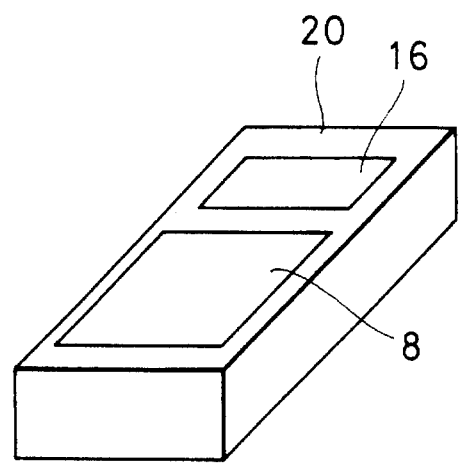
FIG. 2 is an illustration showing inclination of a main, body during dialing operation in one embodiment of the portable telephone set according to the invention.
Figure 3:
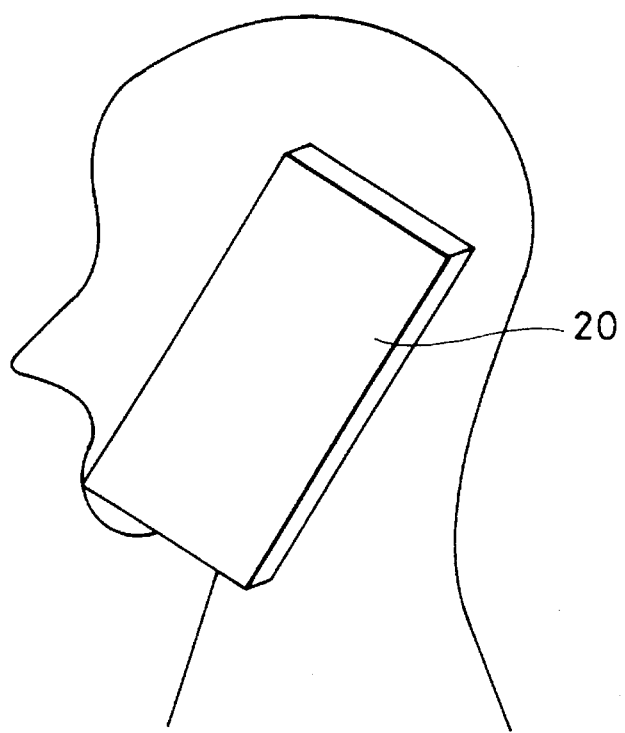
FIG. 3, an illustration showing inclination of a main body during speaking it one embodiment of the portable telephone set according to the invention.

FIG. 2 is an illustration showing inclination of the main body a during a dialing operation for the one embodiment of a portable telephone set according to the invention, and FIG. 3 is an illustration showing inclination of the main body during speaking and not out-dialing for the one embodiment of portable set according to the invention.

In FIG. 2 when the dial buttons 8 of the portable telephone set are to be operated, the main body 20 should be held in substantially horizontal orientation, directing dial buttons 8 and the display portion 16 upwardly.

At this condition, when dial buttons 8, call origination button 9 and reception button 10 are selectively depressed, connection to the remote terminal is established for enabling speaking. During speaking, the main body 20 is held in substantially vertical orientation. The orientations of the main body 20 as illustrated in FIGS. 2 and 3, are detected by the gyro 18 and the inclination angle information is input to the display control portion 17, as set forth above.

Therefore, as set forth above, the display control portion 17 performs the power supply control so the power is supplied to the display portion 16 when the main body is placed at the substantially horizontal orientation as detected by the gyro 18. On the other hand, when the gyro 18 detects the fact that the main body is placed at substantially vertical orientation, the display control portion 17 shut down the power supply for the display portion 16.

Thus, according to the shown embodiment, when the inclination angle information indicative that the main body is in a substantially horizontal orientation and when the reception control command from the reception control portion 2 and the call origination control command from the call origination control portion 3, the display control portion 17 starts the supply of the power. After speaking is starred, when the inclination angle information indicative of a variation of orientation of the main body from the horizontal position to the vertical position, the display control portion shuts off power supply for the display portion 16. Therefore, in the state of the portable telephone set in which the display portion 16 will not be seen, no power will be supplied to the display portion 16. Therefore, power consumption can be reduced. As well, it should serve for reducing the depletion of the battery.

It should be appreciated that the wording "substantially horizontal orientation" as defined throughout the disclosure represents the position of the main body where the dial button array, call origination button, reception button and display portion face toward the user's face, which may not be necessarily exactly horizontal, but instead is over relatively wider range of orientation; and the wording "substantially vertical orientation" as defined throughout the disclosure represents the position of the main body where the dial button array, call origination button, reception button and display portion are placed substantially perpendicular to the plane facing with the user's face, which is not necessarily exactly vertical but instead is over a relatively wide range but the position where the speaker is placed in opposition to the user's ear and the microphone is placed in the vicinity of the user's mouth. Although the invent ion has been illustrated and described with respect to exemplary embodiments thereof, it should be understood by those skilled in the art that the foregoing and various other changes, omissions and additions may be made therein and thereto, without departing from the spit it and scope of the present invention. Therefore, the present invent ion should not be understood as limited to the specific embodiments set out above, but will include all possible embodiments within a scope encompassed and equivalents thereof with respect to the features set out in the appended claims.

What is claimed is:

1. A portable telephone set comprising:

display for displaying information associated with a call;

a main body structure for mounting said display means;

detecting means for detecting inclination of said main body structure, said detecting comprising a gyro; and control for controlling a power supply for said display depending upon the inclination detected by said detecting means.

2. A portable telephone set as set forth in claim 1, wherein said control means shut off the power supply for said display when said detecting means detects the main body at a substantially vertical position.

3. A portable telephone set as set forth in claim 1, wherein said control means initiates the power supply for said display means when said detecting means detects the main body at a substantially horizontal position.

4. A portable telephone set as set forth in claim 1, wherein said control shuts off the power supply for said display when said detecting means detects the main body at a substantially vertical position and initiates the power supply for said display means when said detecting detects the main body at a substantially horizontal position.

5. A portable telephone set comprising:

call origination control responsive to a dialing operation for controlling call origination;

reception control responsive to reception of a call for controlling reception;

display for displaying information associated with call origination and reception;

a main body housing said call origination control, means, said reception control and said display means;

detecting for detecting inclination of said main body; and control for controlling a power supply for said display means, said control being responsive to said detecting means detecting a substantially horizontal position of said main body for initiating the power supply for said display.

6. A portable telephone set as set forth in claim 5, wherein said control is responsive to said detecting means detecting a substantially vertical position for speaking after the dialing operation, for shutting off the power supply for said display.

7. A portable telephone set as set forth claim 5 wherein said detection means comprises a gyro.

8. A portable telephone set comprising:

a call origination controller responsive to a dialing operation for controlling call origination;

a reception controller responsive to reception of a call for controlling reception;

a display unit for displaying information associated with call origination and reception;

a main body housing said call origination control means, said reception control and said display means, said main body having an operation button array for dialing operation, call origination and reception;

an inclination detector incorporated in said main body for detecting said main body in a predetermined range of inclination magnitude indicating speaking condition; and a display controller for controlling a power supply for said display unit, said control being responsive to said inclination, detector detecting said main body within said predetermined range of inclination magnitude for shutting down the power supply.

9. A portable telephone set as set forth in claim 8, wherein said display controller is responsive to said inclination detector detecting the inclination magnitude of said main body out of said predetermined range for initiating the power supply when at least one of a plurality of buttons in said operation button array is operated.

* * * * *